May 16, 1939.　　　G. A. PAGE, JR　　　2,158,300
RETRACTABLE LANDING GEAR
Filed Oct. 27, 1934　　11 Sheets-Sheet 1

INVENTOR.
GEORGE A. PAGE Jr.
BY
ATTORNEYS.

FIG.5.

May 16, 1939.  G. A. PAGE, JR  2,158,300
RETRACTABLE LANDING GEAR
Filed Oct. 27, 1934  11 Sheets-Sheet 5

INVENTOR.
GEORGE A. PAGE Jr.
BY
ATTORNEYS.

INVENTOR.
GEORGE A. PAGE Jr.
BY
ATTORNEYS.

May 16, 1939.  G. A. PAGE, JR  2,158,300
RETRACTABLE LANDING GEAR
Filed Oct. 27, 1934   11 Sheets-Sheet 8

INVENTOR.
GEORGE A. PAGE Jr.
BY
ATTORNEYS.

Patented May 16, 1939

2,158,300

UNITED STATES PATENT OFFICE 2,158,300

RETRACTABLE LANDING GEAR

George A. Page, Jr., Ferguson, Mo., assignor, by mesne assignments, to Curtiss-Wright Corporation, a corporation of New York Application October 27, 1934, Serial No. 750,286

1 Claim. (Cl. 244—102)

This invention relates to aircraft, and is particularly concerned with an operating and controlling system for retractable landing gears.

The use of retractable landing gears in aircraft has become fairly common, but in large craft of the transport type, the landing gears are of such a size and weight that for normal service it is necessary to operate them by power means, such means having taken the form of electric motor or hydraulic drives. There is the inevitable possibility in power driven mechanisms of failure, so that this invention, among other things, is concerned with the provision of alternative hand operating mechanism for extending and retracting landing gear normally operated by power. In addition, a third emergency system of manual operation is provided in the event of the failure of part of the primary manual mechanism.

In large planes of the type mentioned, frequently the position of the landing gear is not readily determined by the pilot, or his attention may be so occupied with other duties in the flying of the craft that his attention may be diverted from the condition of the landing gear. Therefore, it is an object of the invention to provide visual and aural signaling means to inform the pilot or crew of the state of extension or retraction of the landing gear.

It will now be appreciated that the several phases of my invention involve a plurality of mechanisms all contributing to the end of effective and safe operation of the landing gear—and hence of the aircraft. The several mechanisms involved are so correlated as to facilitate control of the landing gear by the pilot, and certain of the mechanisms are so correlated in conjunction with the landing gear structure that some of the elements serve as parts of one or more of the several operating mechanisms, and also as part of the signaling system.

A clearer understanding of the invention may be appreciated by referring to the annexed drawings in connection with the specification.

Figures 1, 2:
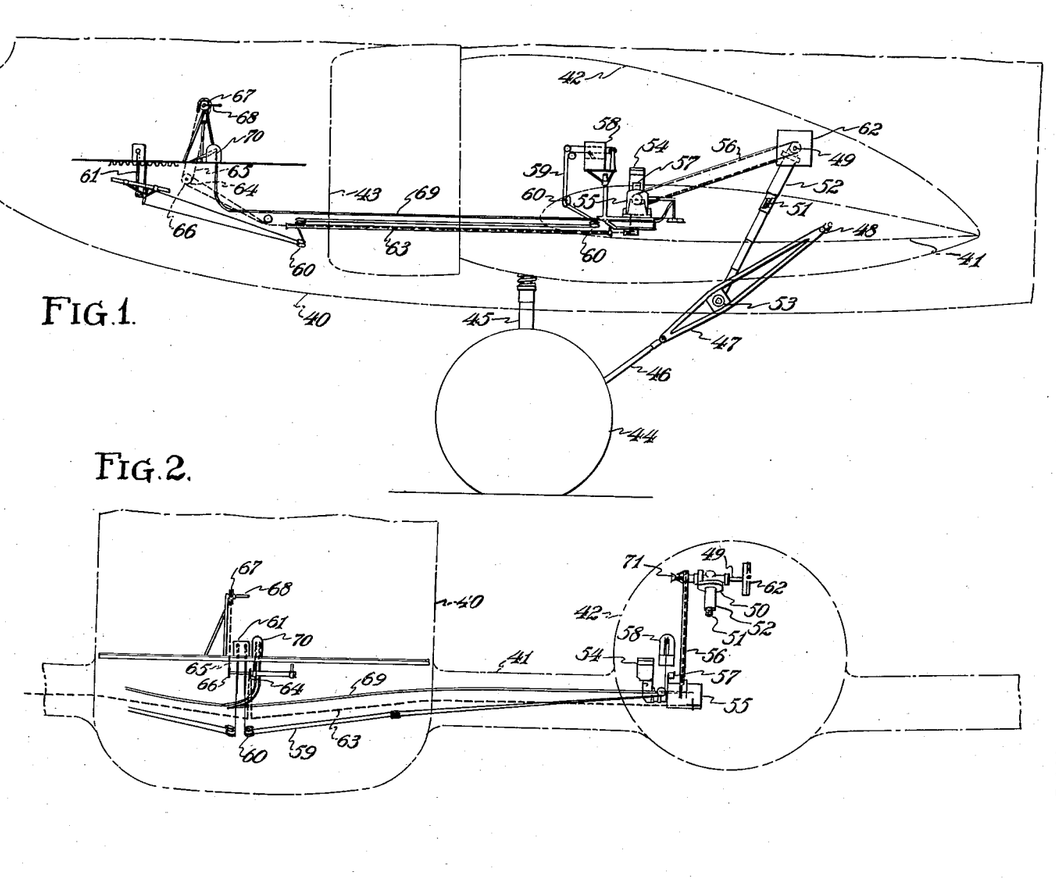
Fig. 1 is a side phantom view of part of an aircraft showing a landing gear and operating elements therefor.
Fig. 2 is a front phantom view of the aircraft showing the same landing gear elements as in Fig. 1.
Figures 3, 4:
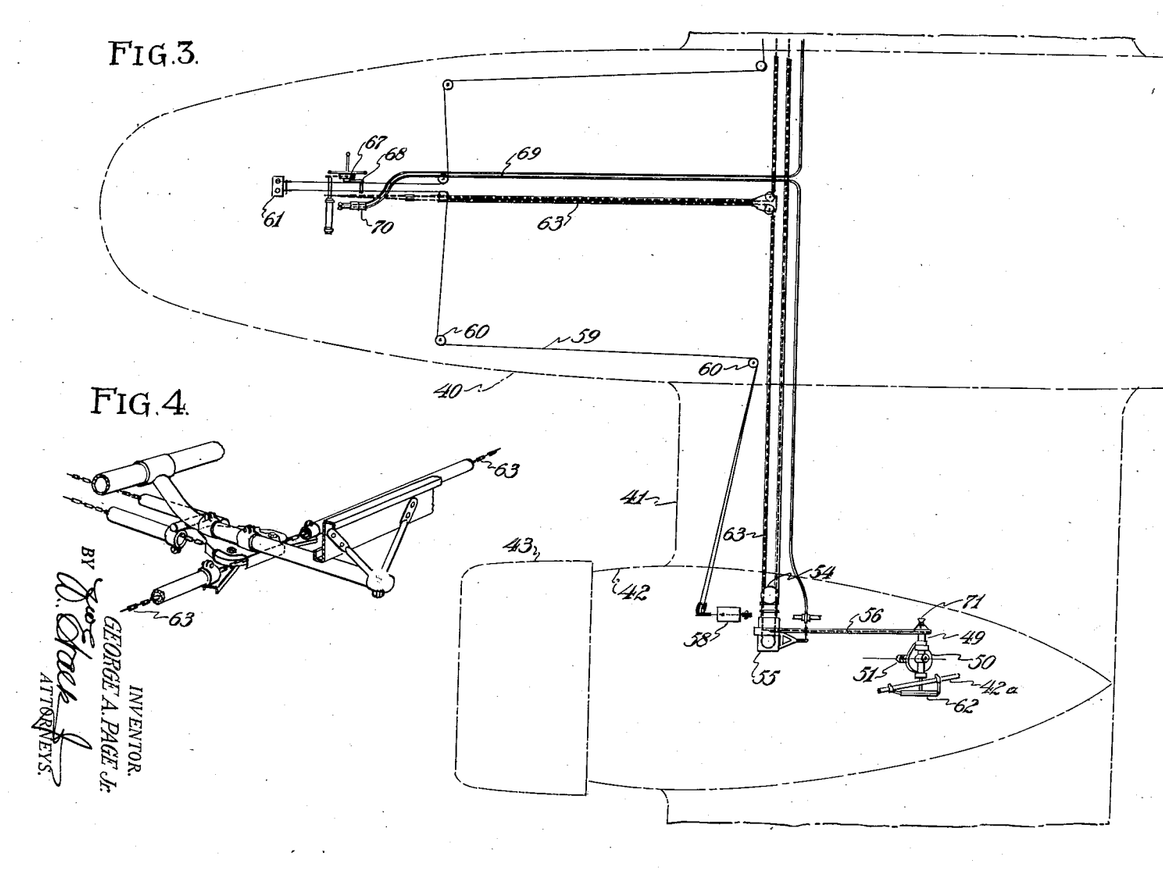
Fig. 3 is a plan phantom view of the aircraft showing the same elements as shown in Figs. 1 and 2.
Fig. 4 is a perspective detail view of certain of the elements shown in the previously mentioned figures.
Figures 6, 7, 8:
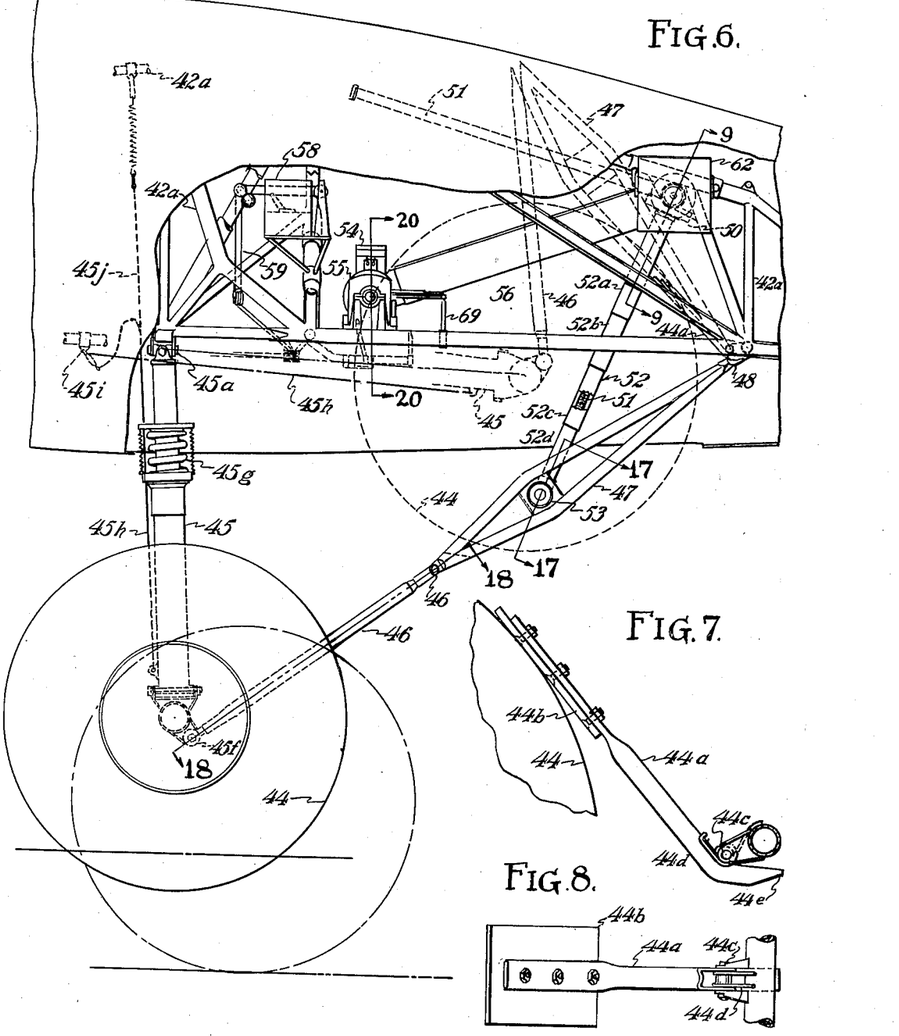
Fig. 6 is a side elevation of part of the airplane showing the landing gear structure in extended position and showing in greater detail the disposition of parts of the operating mechanism.
Fig. 7 is an enlarged side elevation of a portion of the airplane wheel and of a wheel brake for preventing rotation of the wheel when retracted.
Fig. 8 is a plan of the brake of Fig. 7.

Reference may be made to Figs. 1, 2 and 3 in which a more or less diagrammatic layout of the landing gear and its operating mechanism is shown. In these figures, 40 is an airplane fuselage which is occupied by the aircraft crew, and which contains the several control elements for landing gear operation. From the fuselage, wings 41 extend, the wings carrying nacelles 42 adapted to carry power plants 43, and adapted in their rearward portions to carry the landing gear. It will be appreciated that one nacelle is provided on each side of the fuselage, and that right and left landing gear units are provided in the respective nacelles, the right and left landing gear units being similar in all details. Likewise, each landing gear unit is provided with a similar operating, control and signaling mechanism. The landing gear structure itself includes a wheel 44 mounted upon an axle strut connected with a shock absorber strut 45, this strut being pivoted at its upper end in the nacelle, as will be later described. Extending rearwardly from the wheel axle is a strut 46 pivoted at the wheel axle and also at its upper end to a truss strut 47, the latter being swingable about pivots 48 within the nacelle 42. A transverse shaft 49 mounted within the nacelle and above and forwardly of the pivot 48 carries a rotatable mechanism 50, the unit carrying a screw 51 sheathed by a telescoping cover 52, the lower end of the screw 51, at 53, engaging a nut pivoted to the truss strut 47. It will be apparent thus far, that by operating the mechanism 50, the screw 51 will be turned to traverse the truss strut 47 along the screw, to swing the truss strut 47 about its pivot 48. Thereby, the landing gear is extended and retracted. While being retracted from an extended position, the landing gear swings about the fixed pivot of the shock absorber 45 upwardly and rearwardly within the nacelle 42. The retracted position is indicated in Fig. 6.

I provide an electric motor 54 within the nacelle, which operates through suitable gear mechanism on a transmission 55, the transmission driving, through the chain 56, the mechanism 50. Operation of the electric motor is controlled by means of a solenoid switch 57 in conjunction with a double throw, triple pole switch 58 operated by cables 59 running over pulleys 60 to a plunger 61 by which the switch is thrown. The plunger 61 is arranged in such a way that when it is pushed down, extension of the landing gear is initiated, and when pulled up, retraction of the landing gear is initiated. An inter-locking switch 62, which serves also for controlling signal lights, operates in connection with the switches 57 and 58, so that when either extension or retraction of the landing gear is initiated, the landing gear will travel to the desired position and will then automatically stop. By virtue of the screw 51, the landing gear is irreversible when subjected to external impact.

The transmission 55 includes a clutch organization, to be described later in detail, by which the electric motor 54 may be disconnected from the landing gear and by which a manual control may be connected thereto. The manual control comprises a sprocket forming part of the transmission 55 over which a chain 63 runs to a sprocket 64 below the pilot's compartment. Thence, a chain 65 runs from a sprocket 66 rotatable with the sprocket 64, to a sprocket 67 on which a hand crank 68 is mounted. Means are provided to shift the aforementioned clutch, forming part of the transmission 55, said means comprising a Bowden cable 69 terminating within the pilot's compartment in the handle 70, said handle serving to shift the clutch of the transmission 55 for electric operation, for manual operation, or into a neutral position.

Figure 5:
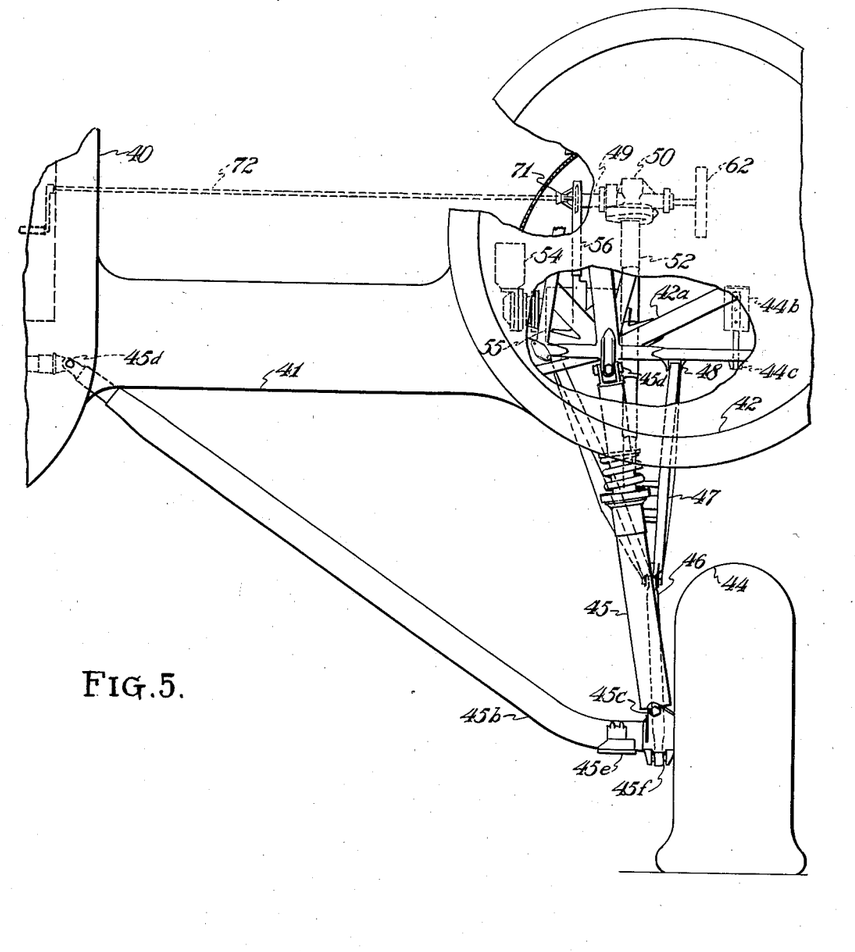
Fig. 5 is a front elevation of part of the airplane and landing gear showing the landing gear structure in an extended position, and showing the emergency actuating mechanism in an operative position.

An emergency manual operating means is provided for the landing gear should the electrical system or the primary manual means fail, this emergency means comprising an extension crank which may be passed outwardly from within the fuselage to engage a socket 71 forming part of the mechanism 50 within the nacelle. This extension crank is shown in Fig. 5, and is designated as 72.

Detailed consideration will now be given to the several components of the assembly, and for convenience in tracing the several figures, the numbers designating elements in Figs. 1, 2 and 3, will be used to denote group assemblies, the detail parts being designated by the assembly number followed by a letter. Subsequently, consideration will be given to the unified operation of the whole mechanism.

Figure 17:
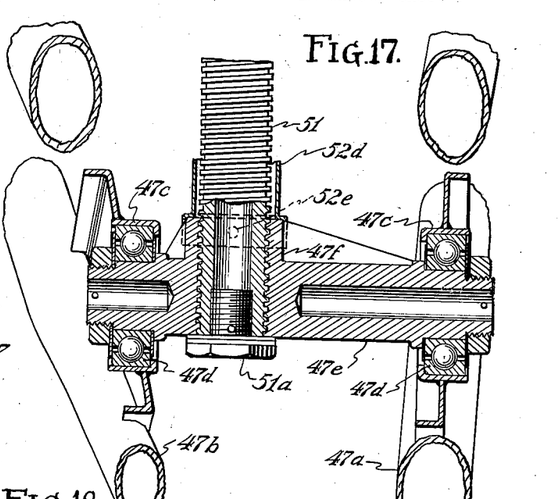
Figs. 17 and 18 are sections on the lines 17—17 and 18—18, respectively, of Fig. 6, showing details of the strut of Fig. 16.
Figure 18:
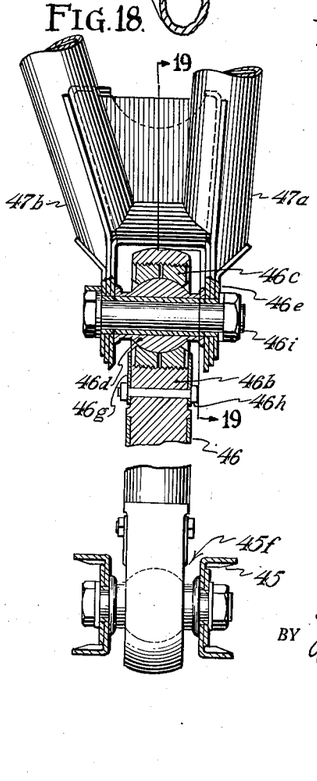
Figure 19:
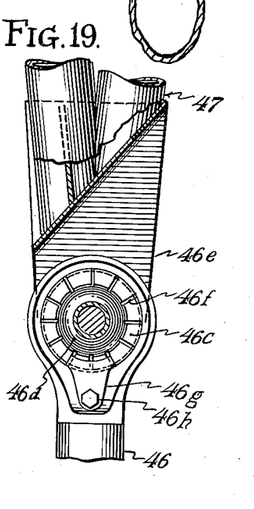
Fig. 19 is a section on the line 19—19 of Fig. 18.
Figure 20:
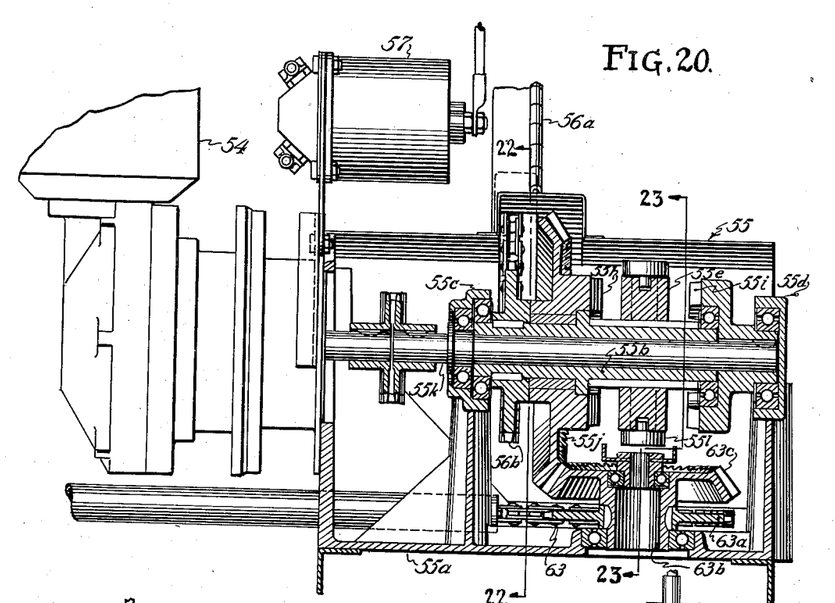
Fig. 20 is a section on the line 20—20 of Fig. 6, showing the construction of the power transmission mechanism.

The details of the landing gear structure are best shown in Figs. 5 to 8, inclusive. It will be here noted that the shock absorber 45 is pivoted to structure 42a of the nacelle 42 at 45a by a universal joint. The lower end of the shock absorber 45 is pivoted to an axle strut 45b at 45c, the axle strut carrying the wheel 44, and in turn being universally pivoted to the fuselage 40 at 45d. The lower end of the axle strut 45b carries a jack pad 45e, and a ball joint connection 45f, to which the strut 46 is pivoted for limited universal movement. At its upper end, the strut 46 is pivoted for limited universal movement with respect to the truss strut 47, at 46a. This truss strut, as best shown in Figs. 16 to 19, comprises truss side members 47a and 47b spaced at their upper ends and engaging the pivots 48, converging at their lower ends to the pivot 46a. Intermediate said pivots, bearing hangers 47c are attached by which, through ball bearings 47d, a cross shaft 47e is rotatably carried. The shaft is provided with a central nut 47f into which the screw 51 is threaded, the screw having an end plug 51a to form a limit stop against the nut 47g. Thus, the screw 51 is turnable on its own axis by means of the mechanism 50, acting on the nut 47g to cause translation of the latter along the screw. The bearings 47d allow the shaft 47e to swing with the screw relative to the strut 47. Figs. 18 and 19 show the details of the pivot connection 46a, wherein the strut 46 carries a threaded eye 46b into which opposed socket elements 46c are threaded to engage a ball center shaft 46d, carried by projections 46e on the strut 47. The socket elements 46c are provided with radial serrations 46f by which they may be adjusted, and a locking piece 46g is arranged to engage certain of the serrations and to be screwed as at 46h to the strut 46. A bolt 46i holds the ball center shaft 46d in position. The connection 45f at the lower end of the strut 46 is similar in its details to that just described.

Now returning to Figs. 5 to 8, an arm 44a having a shoe 44b bolted thereto, is pivoted at 44c to the nacelle structure 42a, adjacent the axis of the pivot 48. A spring 44d tends to urge the arm 44a downwardly, the downward movement being limited by a projection 44e on the arm which abuts against the nacelle structure. When the wheel is retracted within the nacelle, the periphery thereof engages against the shoe 44b, whereby rotation of the wheel within the nacelle is prevented. If this brake were not provided, it would be possible for the wheel 44 to continually rotate while within the nacelle, since the lower portion thereof is continually exposed to the fast moving air stream.

Means are provided for shortening the shock absorber strut 45 when the landing gear is retracted, the shock absorber being of that type in which there are two phases of shock absorbing movement—the first phase being that of hydraulic shock absorption without restitutional effect, and the second phase, for taxiing of the craft along the ground, being of the type wherein there is a restitutional effect as imposed by a spring such as 45g. A cable 45h is attached at one end to the lower end of the strut 45 and at its upper end to the nacelle structure as at 45i, the connection 45i being forward of the strut joint 45a. When the landing gear is in its unloaded position, as when the aircraft is in flight, the wheel will assume a position such as that shown in dot-and-dash lines in Fig. 6. When the aircraft is resting upon the ground, the wheel will assume a position such as that shown in solid lines in Fig. 6. When the aircraft is in the air, and when the wheel is moved upwardly and rearwardly for retraction, the cable 45h will tighten, and by its eccentric position with respect to the shock absorber joint 45a, it will become tight and will collapse the shock absorber strut to a length more or less equivalent to the "one load" landing gear position. The retracted wheel position is indicated in dotted lines in Fig. 6. An auxiliary cable 45j is spliced into the cable 45h, and is resiliently connected to the nacelle structure, so that when the shock absorber is compressed, when it is in its landing attitude, the slack in the cable 45h will be taken up.

The retracted position of the struts 45, 46 and 47 is shown in Fig. 6, the struts 46 and 47 buckling with respect to each other and occupying an upwardly pointing position within the nacelle. As the screw 51 is traversed within the nut assembly 47g, the strut 47 swings upwardly, and simultaneously the screw swings upwardly and forwardly through an arc of approximately 90°. The swinging of the screw 51 and correspondingly, of the shaft 49 should be borne in mind in connection with the operation of the signaling switch 62 hereafter to be described in detail.

Figures 9, 11:
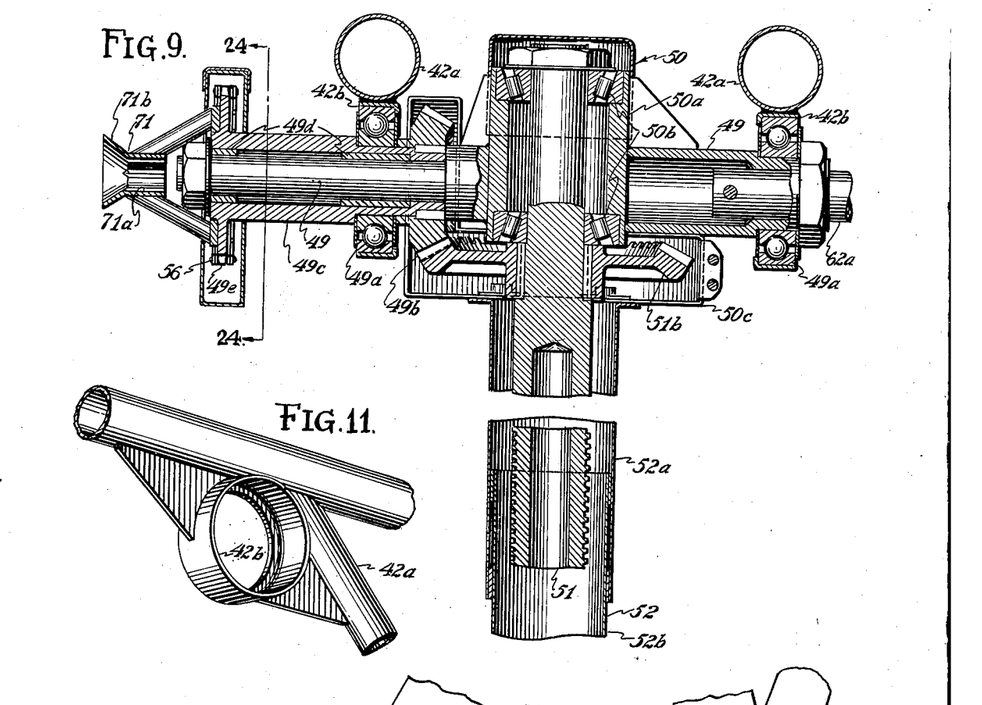
Fig. 9 is an enlarged section on the line 9—9 of Fig. 6.
Fig. 11 is a perspective view of a bearing hanger as used in the mechanism of Figs. 9 and 10.
Figure 10:
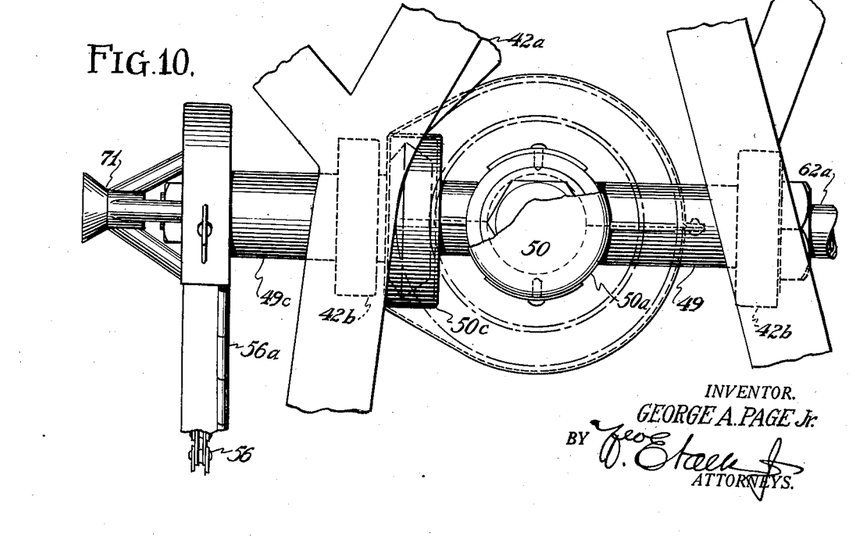
Fig. 10 is a plan of the mechanism shown in Fig. 9.

Reference may now be made to Figs. 9, 10 and 11 which show the details of construction of the mechanism 50 for rotating the screw 51. Here it will be seen that bearing hangers 42b on the nacelle structure 42a, carry bearings 49a in which the shaft 49 is journaled for swinging in a vertical plane. The shaft carries a boss 50a at its mid portion in which the upper end of the screw 51 is borne for free rotation in bearings 50b. To the screw 51, a bevel gear 51b is keyed, this gear engaging with a bevel pinion 49b mounted on a sleeve 49c coaxial with, and rotatable with respect to the shaft 49 on bushings 49d. The sleeve 49c extends beyond one of the bearings 49a and carries the sprocket 49e over which the chain 56 from the mechanism 55 runs. The socket 71, adapted to be engaged by the emergency operating shaft 72, is fastened to the sprocket 49e, the socket including internal splines 71a and a funnel-shaped guide 71b to facilitate the insertion of the shaft 72 within the socket, the shaft having splines complementary to the splines 71a whereby turning of the shaft 72 will rotate the shaft 49c. It will be seen that the shaft 49 permits the screw 51 to swing with respect to the nacelle, while the shaft 49c, when turned by any one of the three operating mechanisms, turns the screw 51 by virtue of its geared connection therewith.

A suitable dust closure 50c is provided for the gears, from which closure, the telescoping cover 52 extends. This cover comprises a plurality of inter-fitting tube portions 52a, 52b, 52c and 52d, the latter being attached, as shown in Fig. 17, by means of a pin 52e to the nut 47f. When the nut 47f is moved with respect to the mechanism 50, the telescoping cover 52 extends or diminishes in length accordingly, thereby keeping the screw 51 free from dust, and retaining lubricant thereon. A dust cover 56a is provided for the chain 56.

Reference may now be made to Figs. 20 to 23a, inclusive, which show details of construction of the transmission mechanism 55. The chain 63, which comes to the transmission from the hand operating mechanism in the pilot's compartment, engages a sprocket 63a mounted on a shaft 63b, which carries a bevel pinion 63c, said shaft being rotatably carried by the housing 55a of the transmission 55. The cross shaft 55b is borne in the housing at 55c and 55d, and carries a sprocket 56b over which the chain 56 runs. A clutch collar 55e is mounted for rotation with and translation with respect to the shaft 55b, the collar having opposed teeth 55f and 55g for engagement respectively with corresponding teeth 55h or 55i. The teeth 55h are carried on a gear 55j engaging the gear 63c, while the teeth 55i are carried on a shaft 55k directly connected to the electric motor 54.

Figure 21:
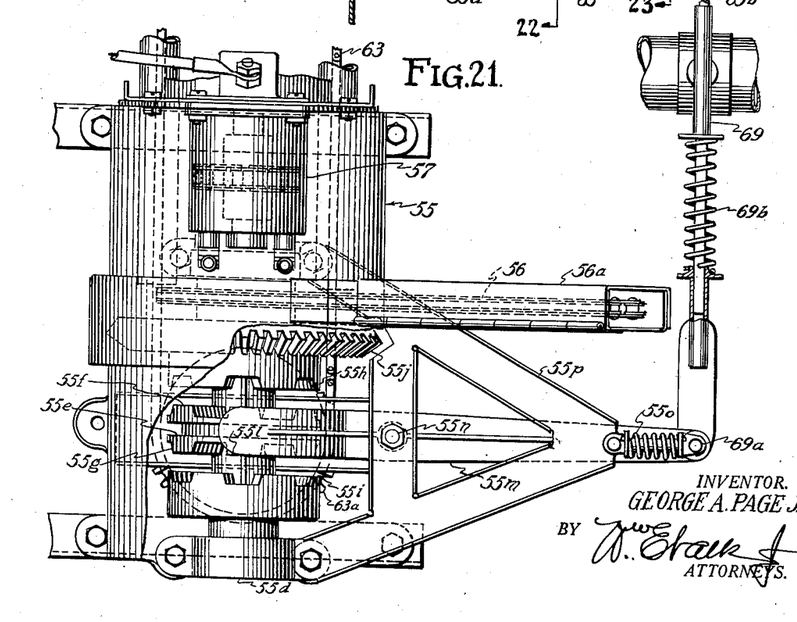
Fig. 21 is a plan of the mechanism of Fig. 20.
Figures 22, 23, 24:
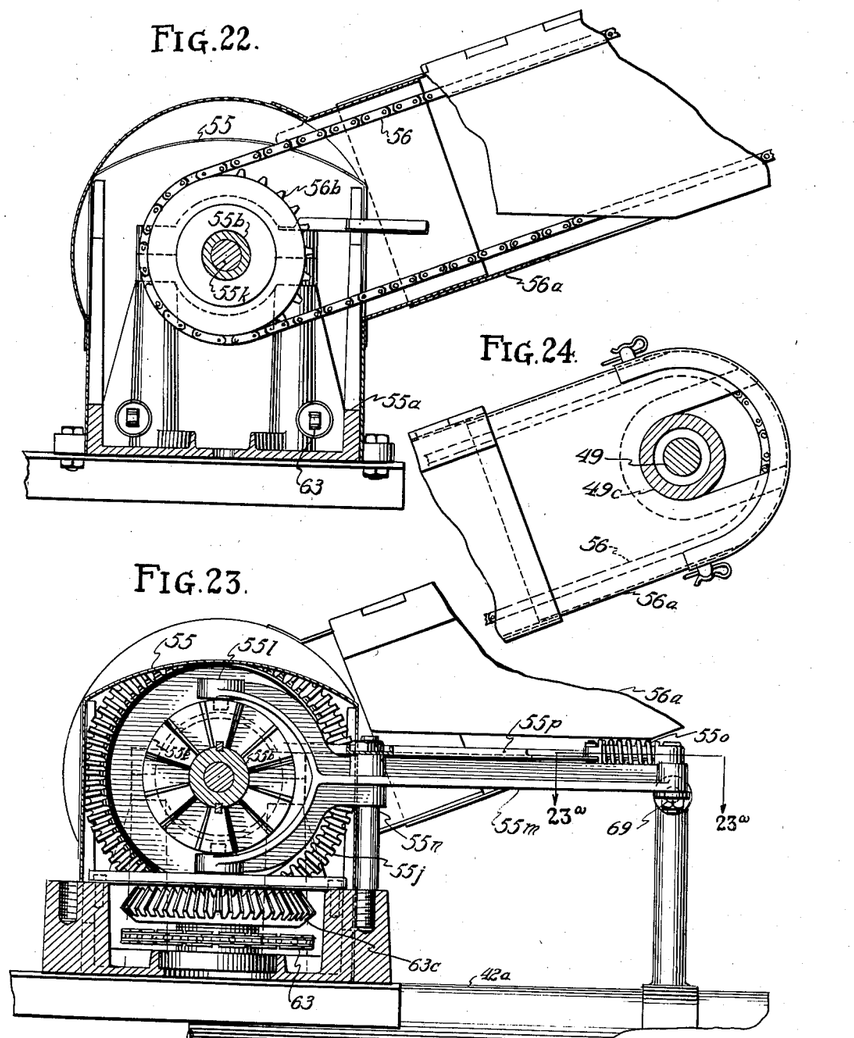
Figs. 22 and 23 are sections, respectively, on the lines 22—22 and 23—23 of Fig. 20.
Fig. 24 is a section on the line 24—24 of Fig. 9.
Figure 23A:
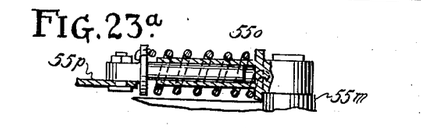
Fig. 23a is a section on the line 23a—23a of Fig. 23.

The clutch collar 55e is provided with a circumferential groove within which elements 55l of a shifting yoke 55m engage. The yoke 55m is pivoted at 55n to the housing 55a, and, as best shown in Figs. 21 and 23, is provided at its outer end with a spring 55o, tending to urge the collar 55e to a neutral position between the sets of teeth 55h and 55i. A spring is mounted at one end to a frame 55p fixed to the housing 55a, and to its other end to the yoke 55m. The Bowden control 69, coming from the pilot's compartment, is pivotally connected at 69a to the yoke 55m, so that by pushing or pulling the Bowden wire 69b, the yoke is shifted to cause engagement of the toothed collar 55e with one or the other of the sets of teeth. When the collar is engaged with the teeth 55h, a driving connection is established between the hand crank in the pilot's compartment and the landing gear, through the chain 63, the gears 63c and 55j, the clutch, and the sprocket 56b. When the clutch is oppositely shifted, so that the collar engages the teeth 55i, driving engagement is effected between the motor 54, the shaft 55k, the clutch, and the sprocket 56b. When in neutral position, the motor 54 and the pilot's hand cranking mechanism are both disconnected, which will then permit the use of the emergency hand crank 72 for extending or retracting the landing gear.

Figures 25, 26, 27, 28, 29, 30, 31:
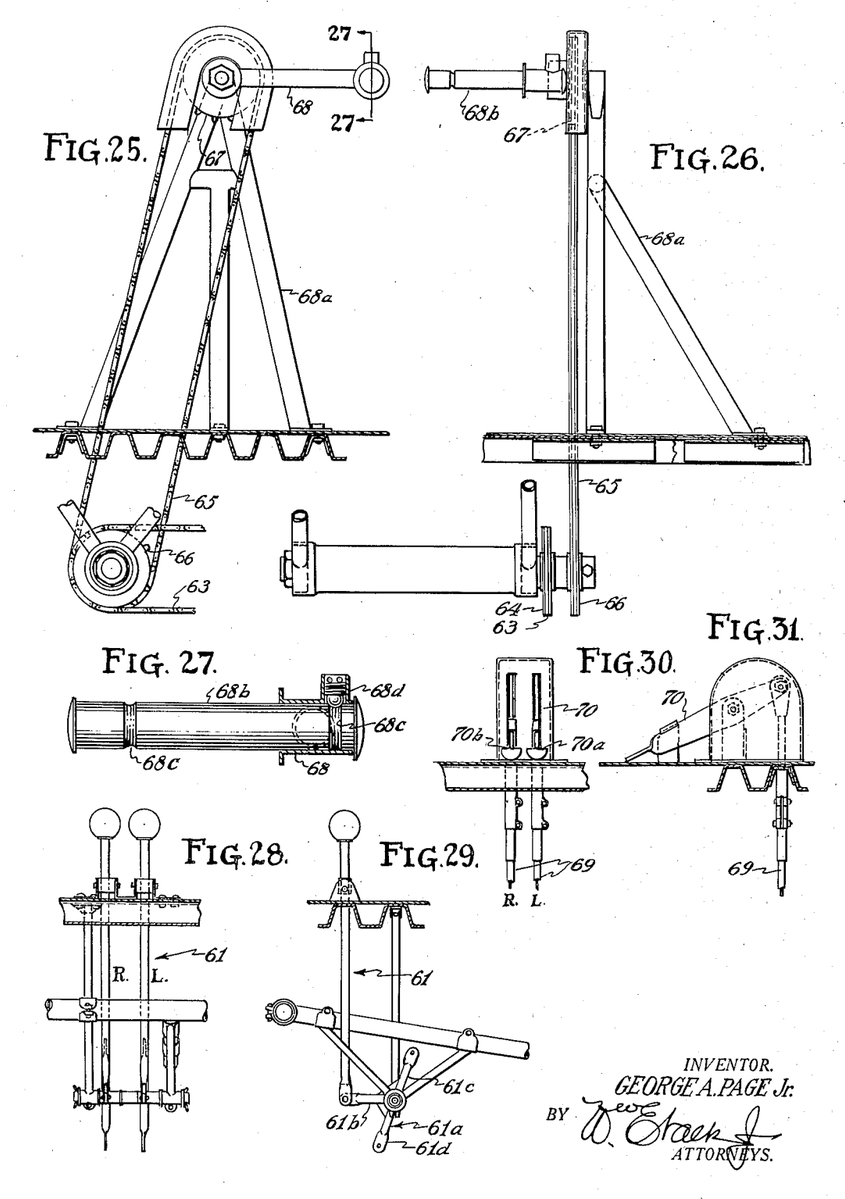
Fig. 25 is an enlarged side elevation of the principal hand operating mechanism also shown in part of Fig. 1.
Fig. 26 is a rear elevation of the mechanism of Fig. 25.
Fig. 27 is a section on the line 27—27 of Fig. 25.
Figs. 28 and 29 are front and side elevations, respectively, of the power retracting and extending controls.
Figs. 30 and 31 are front and side elevations, respectively, of the controls for switching from power to hand operation of the landing gear.

Referring briefly to Figs. 25 and 26, the hand crank 68 is mounted on brackets 68a fixed to the deck of the pilot's compartment. The crank is provided with the handle 68b having a sliding connection with the crank so that the handle may be shifted to an operative position, or may be pushed inwardly so that it is out of the way. Grooves 68c in the handle 68b are engaged by a spring pressed keeper 68d in the crank 68 to hold the handle in position.

Figs. 30 and 31 show details of the clutch shifting handle 70, operating on the Bowden control 69, one lever 70a being provided for the left hand landing gear, and a second lever 70b being provided for the right hand landing gear. In normal operation, both of the handles 70a and 70b will be depressed to allow power operation of both landing gears simultaneously by their respective mechanisms. Should hand cranking from the cockpit be necessary, one or both of the handles 70a and 70b may be shifted to the hand operating position, so that either one or both of the right and left hand landing gears may simultaneously be operated by means of a crank 68. If emergency hand operation of the landing gears is necessary, the handles 70a and 70b are placed in intermediate neutral positions to permit individual cranking of the landing gear by means of the shaft 72 previously described.

The plungers 61 are duplicated, one for the right hand and one for the left hand landing gear, each operating on a bell crank 61a having an arm 61b to which the plunger is pivoted, and having opposed arms 61c and 61d to which the ends of the switch cable 59 are attached.

The signal switch mechanism 62 is shown in Figs. 12 to 15, inclusive, the mechanism comprising a shaft 62a extending from, and rotatable with the shaft 49 which carries a portion of the retracting mechanism. This shaft carries, within the switch housing 62b, a drum 62c of electrically conductive material, the drum having segmental recesses 62d, 62e and 62f formed in its periphery. A plurality of similar drum contacting elements 62g, 62h, 62i, 62j and 62k, are disposed about the periphery of the drum and are fixed to the housing 62b. Each of the elements 62g to 62k, inclusive, comprises a leaf spring 62l swingable on a pivot 62m, the pivot being attached to the housing 62b in a segmental slot 62n, whereby the position of the pivot 62m may be adjusted with respect to the drum periphery. A spring 62o serves to urge the leaf 62l against the drum periphery, while a connector strip 62p joins the leaf 62l with a binding post 62q by which the spring 62o is also carried.

Figure 32:
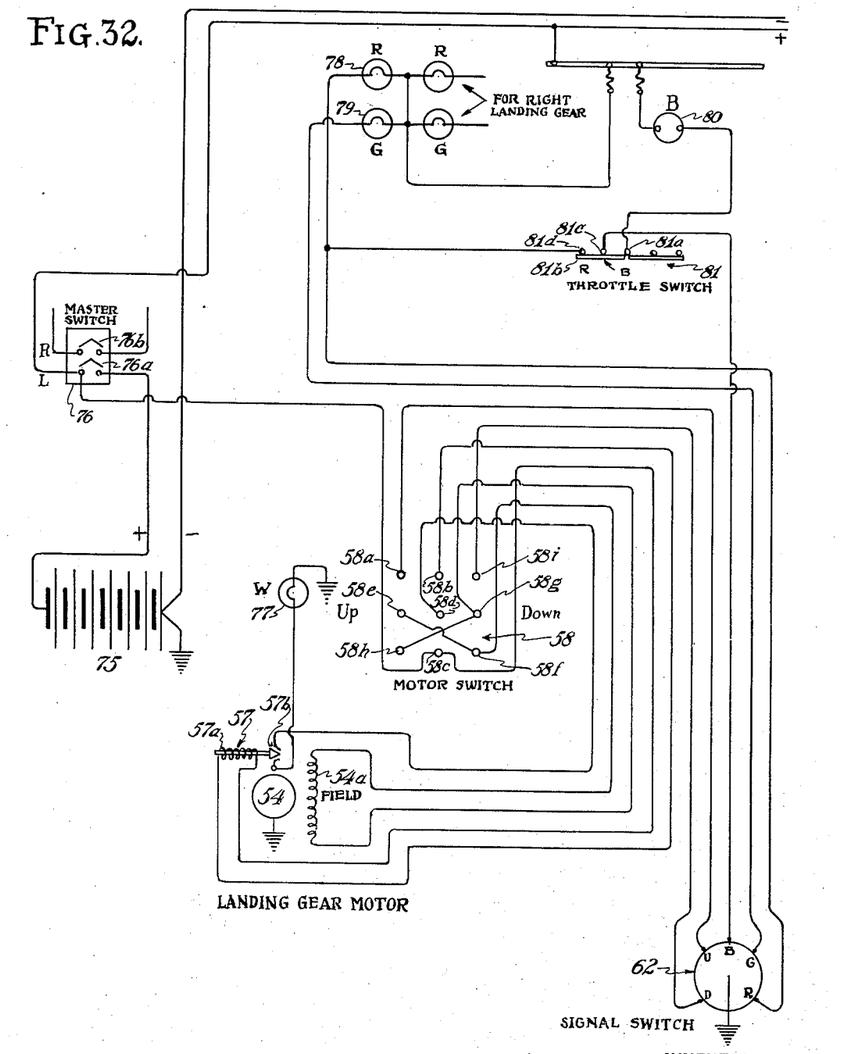
Fig. 32 is a wiring diagram of the electrical circuits for the electric operating mechanism and for the signaling system.

The electrical connections of the signaling switch 62 will now be described in conjunction with Fig. 32 showing the electrical circuits for the whole system.

Figure 12:
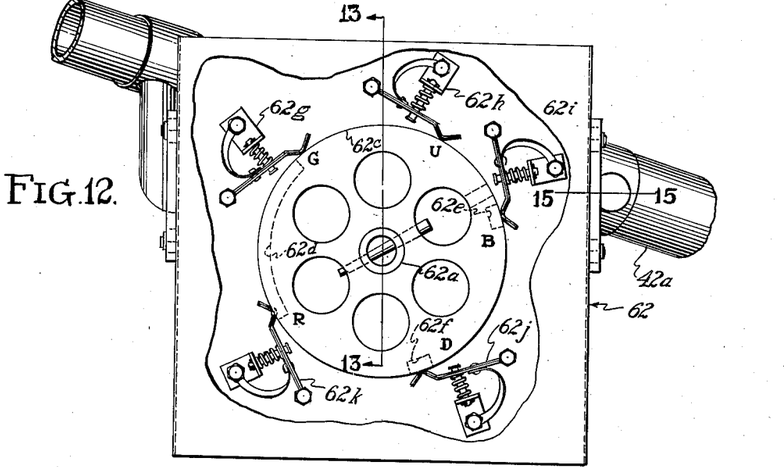
Fig. 12 is an enlarged side elevation, partly broken away, of the signal switch.
Figures 13, 14, 15:
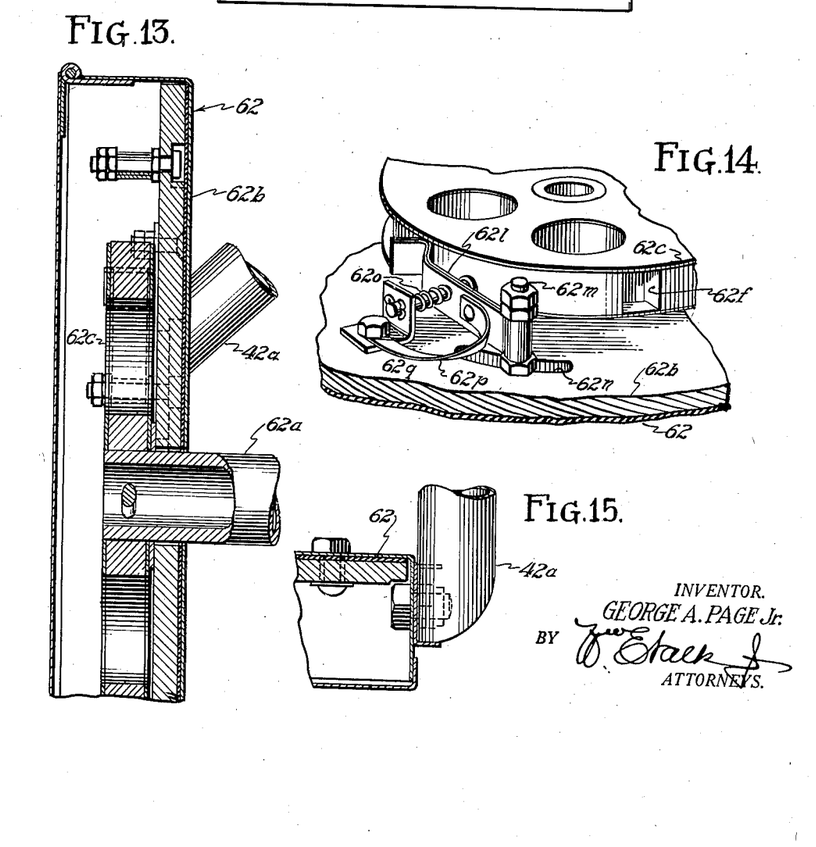
Fig. 13 is an enlarged section on the line 13—13 of Fig. 12.
Fig. 14 is an enlarged perspective view of part of the signal switch.
Fig. 15 is a section on the line 15—15 of Fig. 12.
Figure 16:
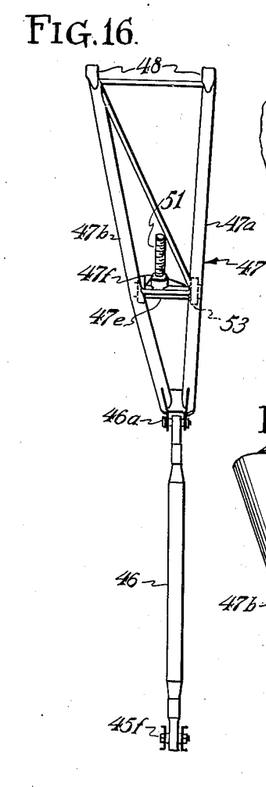
Fig. 16 is a plan of one of the landing gear struts.

A storage battery 75 is connected at one end to ground, and at its other end to a series master switch 76. It will be understood that the circuit shown in Fig. 32 applies to one of the landing gear units, the battery and certain other elements being duplicated for the other landing gear unit. The master switch is dual, having a switch unit 76a, for instance, the left landing gear, and a switch unit 76b for the right landing gear. In describing the functioning of the electrical circuits, we will assume the landing gear to be in the down or extended position, and that it is desired to raise the landing gear. Fig. 12 shows that the signal switch drum recess 62f breaks the contact of the drum 62c with the down element 62j. However, the up contact element 62h touches the drum, thereby connecting the element 62h with ground. The pilot will have thrown the motor switch 58 to the left to effect retraction of the landing gear. Thereby, the circuit then flows from the contact 58a to the contact 58b, thence to the magnet 57a of the solenoid switch 57, and thence, through the switch terminal 58c to the master switch 76a. Thereby, the solenoid switch 57 is energized, closing the power circuit at 57b for the armature of the motor 54. It will be noted that one side of the armature is grounded, the other side thereof being provided with power from the motor switch contact 58d which will be in contact with the motor switch contact 58e. This, in turn, is connected through the terminal 58f through the field 54a of the motor, thence to the motor switch contact 58g cross-connected to the motor switch contact 58h, which will be switched to the power switch terminal 58c connected to the battery. Thereby, starting of the motor is effected to retract the landing gear.

As the landing gear retracts, the shaft 62a of the signal switch is rotated by virtue of the rotation of the shaft 49, the drum rotation in this case being clockwise, as shown in Fig. 12. When the landing gear reaches a fully retracted position, the end of the drum recess 62d will come under the drum contact element 62h (U) thereby breaking that phase of the circuit. Thereupon, the solenoid switch is de-energized, causing stoppage of the landing gear motor. When the signal switch drum 62c has turned to the up landing gear position, the signal switch contact 62j will be bearing on the drum 62c in readiness for extensive movement of the landing gear when the motor switch 58 may be thrown in opposite direction. 62j represents the down contact which is connected to the contact 58i of the motor switch 58. When the motor switch 58 is thrown to the down position, the solenoid switch 57 is again energized to complete the motor circuit, but the polarity of the motor field 54a will be reversed to cause reverse rotation of the motor and extension of the landing gear. When shifted to the down position, the switch contacts 58b and 58i will be connected; likewise the switch contacts 58d, 58g and 58c, 58f.

A white light 77 is connected to one terminal of the motor armature and to ground, so that whenever the motor is in operation, the white light shines on the pilot's instrument panel to indicate such fact.

The signal switch 62 likewise controls a red light 78, a green light 79, and a bell 80, the function of these lights and the bell being to apprise the pilot of the condition of the landing gear. Functionally, the red light 78 is illuminated when the landing gear is up, and remains illuminated up until the instant that the landing gear is lowered to its fully extended position. The green light is illuminated only when the landing gear is in its extreme lowermost position. The red and green light connections are as follows: Both lights are connected on one side through a suitable fuse to the power source through the master switch 76. The other side of the red light is connected to the signal switch contact 62k, while the other side of the green light 79 is connected to the switch contact 62g. Referring to Fig. 12 again, it was assumed that that figure represents the switch position when the landing gear is fully extended. It will be noted, then, that the contact 62g touches the drum, thereby lighting the green light and indicating that the landing gear is extended. Immediately upon initiation of retraction of the landing gear, the leaf of the contact 62g drops into the recess 62d, putting out the green light. Also, upon rotation of the drum, the leaf of the contact 62k leaves the recess 62d to contact with the drum, lighting the red light which will remain lighted until the landing gear again reaches its lowermost position.

The bell 80 is connected on one side to the power source, and on its other side to a contact 81a of a throttle switch 81. The switch includes a plate 81b adapted to make or unmake electrical contact with the contact 81a, and also with contacts 81c and 81d. The contact 81c is connected to the signal switch contact 62e, while the contact 81d is connected with the red lamp 78. If the throttle is pulled back during flying, the plate 81d is caused to make common contact with the three contacts 81a, 81c and 81d, thereby causing the electrical circuit to ring the bell and to light the red light, thus warning the pilot that his landing gear is up. Since the throttle closing maneuver is always made prior to landing, the pilot will have the opportunity of again opening up his engines, and to operate his landing gear control to lower the gear. It will be noted in Fig. 12, which represents the signal switch in the landing gear down position, that the contact 62i matches with the drum recess 62e. In any other position of the drum than in the landing gear down position, the element 62i will contact the drum to permit operation of the bell 80 should the throttle be closed. The throttle switch 81 is a duplex arrangement having a plate duplicate to the plate 81b which is operated by the throttle for the right hand engine, the assumption being that the plate 81b is operated by the throttle for the left hand engine. Thus, the bell 80, through the contact 81a, is operated by closure of the throttle of either the right hand or the left hand engine of the aircraft.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications and changes.

I claim as my invention:

In aircraft, in combination, a fuselage, a supporting surface extending laterally out from said fuselage on opposite sides thereof, nacelle structures carried by said supporting surface, one each at opposite sides of said fuselage, each said nacelle structure having formed in its under side an opening, a landing gear fastened to said supporting surface and including landing gear wheels retractable through said openings from an extended position beneath to a retracted position partially within said nacelle structures and vice versa, mechanical means housed within said nacelle structures for extending and retracting said landing gear, power means housed within said nacelle structures adapted to operate said mechanical means, control means for said power means operable from within said fuselage and extended into said nacelle structures through said supporting surface, manual means adapted to operate said mechanical means, said manual means being operable from within said fuselage and extended into said nacelle structures through said supporting surface, mechanism housed within said nacelle structures for selectively connecting said mechanical means to said manual means and to said power means, and control means for said mechanism operable from within said fuselage to achieve said selection, said control means being extended from said fuselage into said nacelle structures through said supporting surface.

GEORGE A. PAGE, Jr.